Oct. 6, 1936.  C. F. RAUEN ET AL  2,056,365
AUTOMATIC TRANSMISSION
Filed Nov. 4, 1933  3 Sheets-Sheet 1
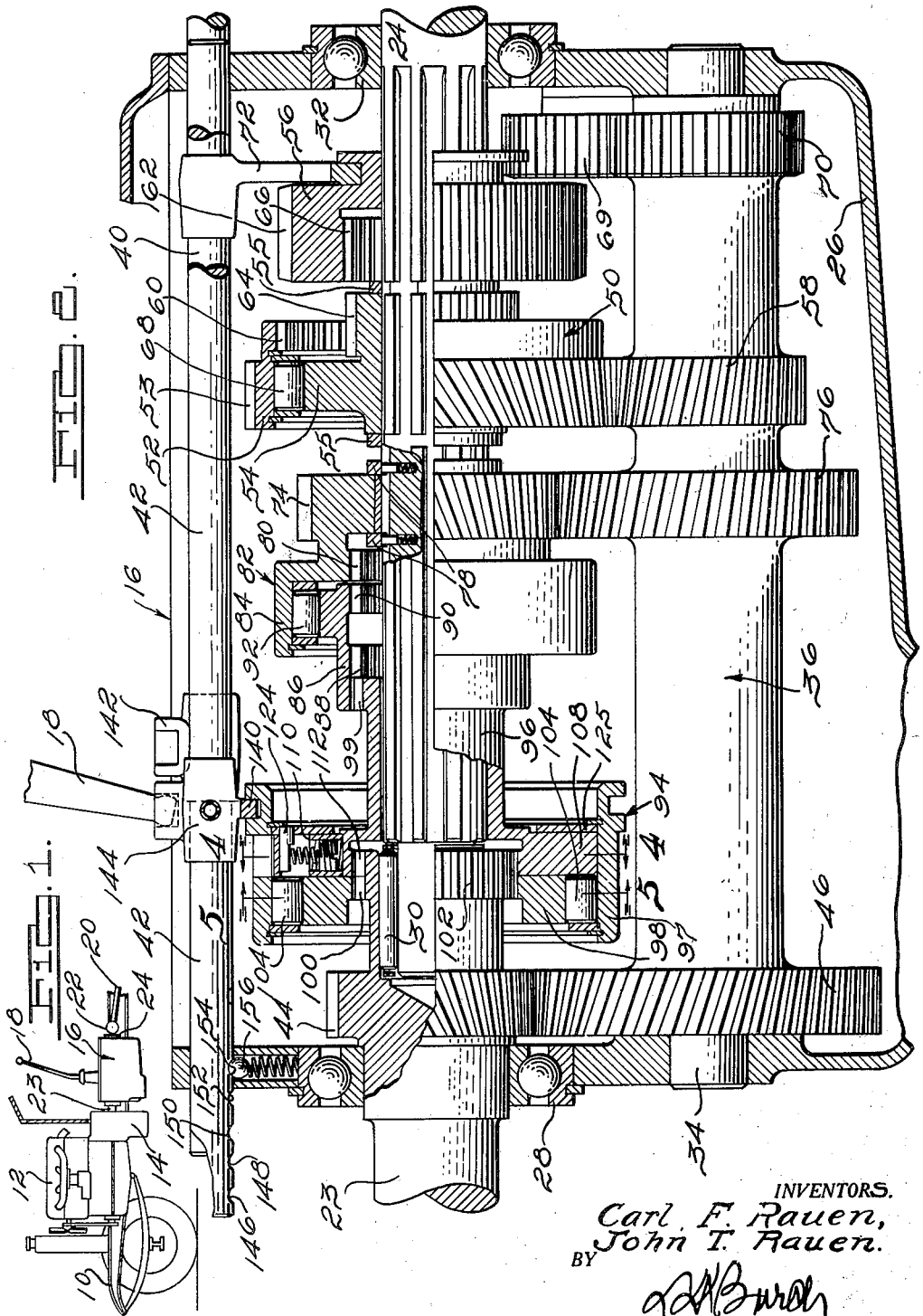
INVENTORS.
Carl F. Rauen,
John T. Rauen.
BY
ATTORNEY.

Oct. 6, 1936.  C. F. RAUEN ET AL  2,056,365
AUTOMATIC TRANSMISSION
Filed Nov. 4, 1933  3 Sheets-Sheet 2
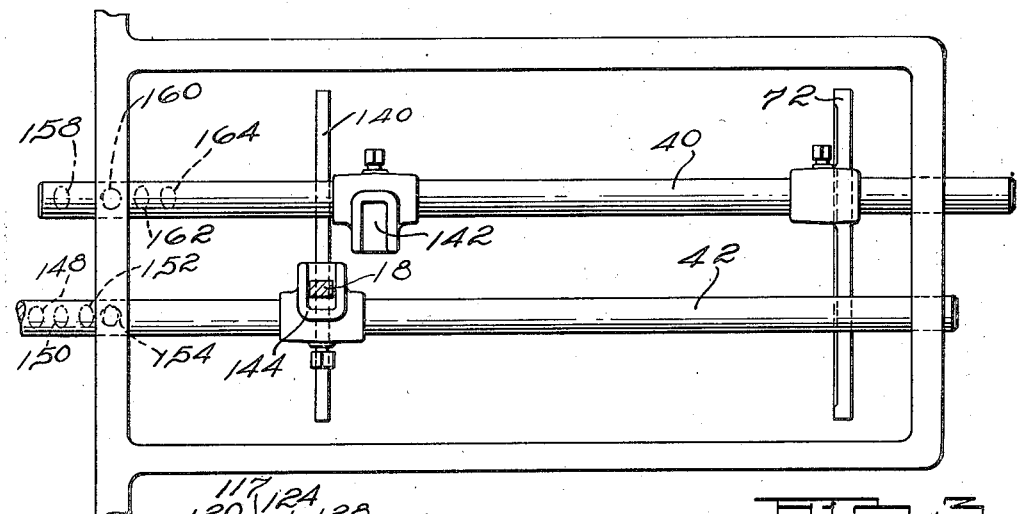
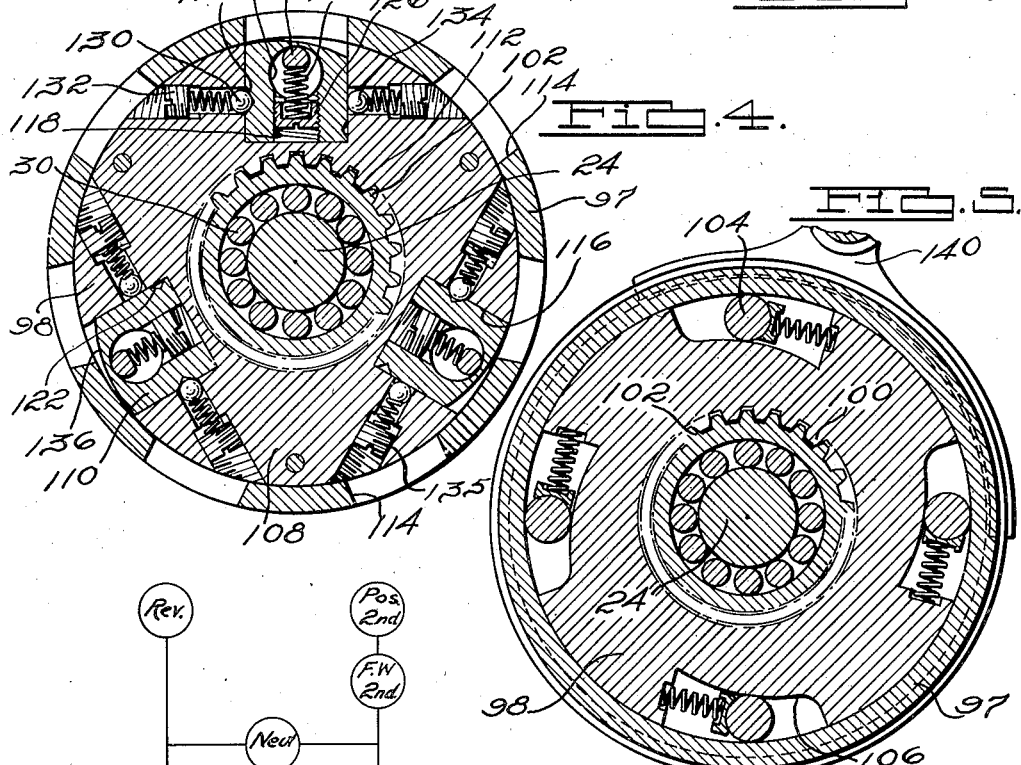
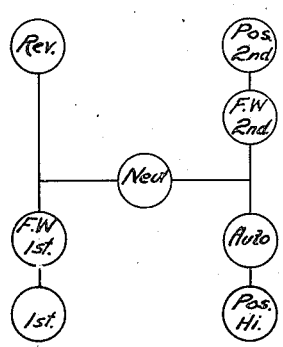
INVENTORS.
Carl F. Rauen,
John T. Rauen.
BY
ATTORNEY.

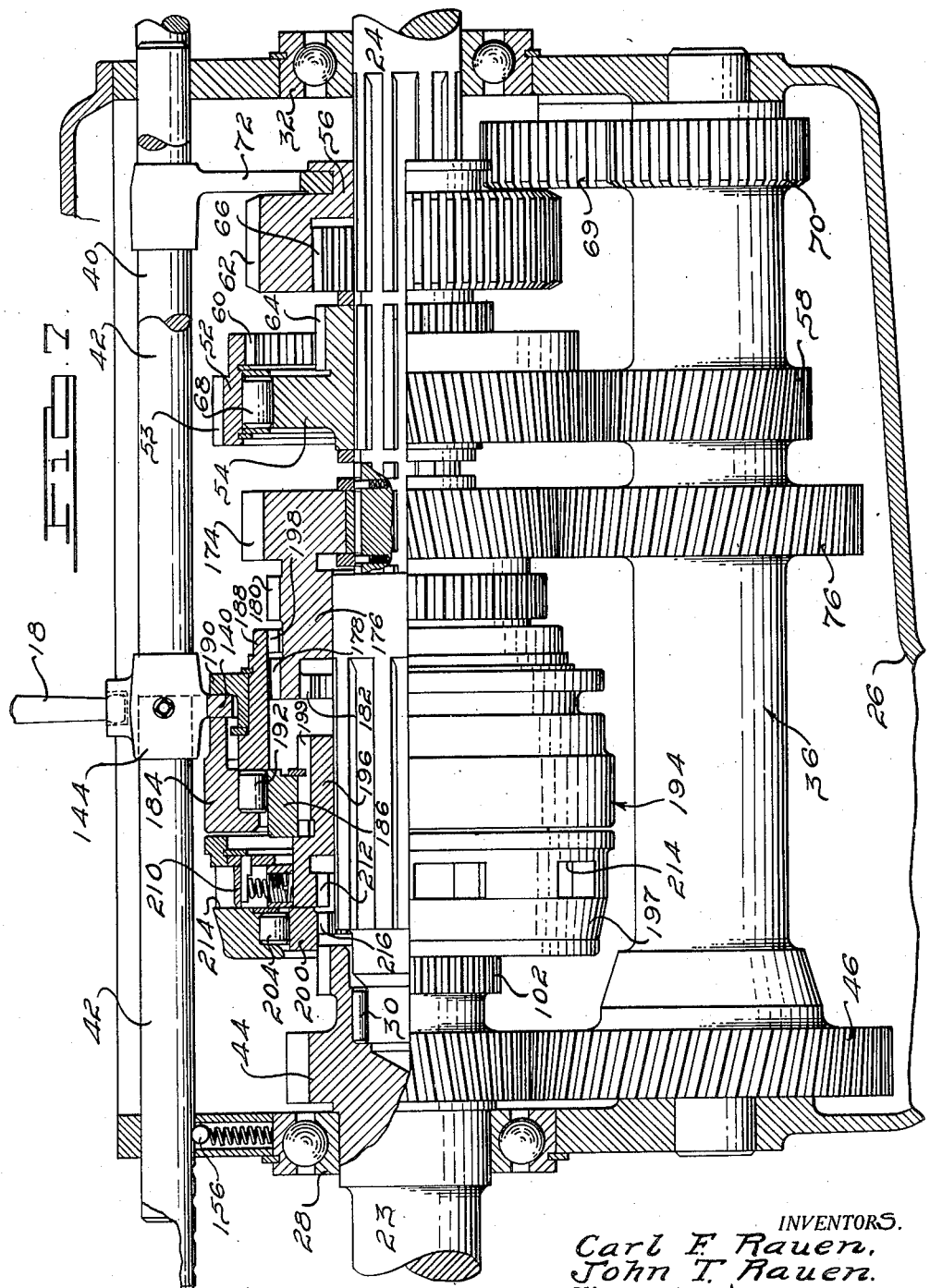

Patented Oct. 6, 1936

2,056,365

UNITED STATES PATENT OFFICE 2,056,365

AUTOMATIC TRANSMISSION

Carl F. Rauen, Grosse Pointe, and John T. Rauen, Detroit, Mich., assignors, by mesne assignments, to Borg-Warner Corporation, a corporation of Illinois Application November 4, 1933, Serial No. 696,627

14 Claims. (Cl. 74—336)

Our invention relates to transmissions, and particularly to automatic transmissions and, as illustrated, is especially adapted for use in automotive vehicles.

An object of our invention is to provide a transmission in which optional free wheeling and positive drives are provided in all forward speeds.

Another object of our invention is to provide an automatic transmission, in which a change from any one speed ratio to any other next succeeding ratio may be effected at any time without regard to the speed of the vehicle and without the necessity of disengaging the main clutch.

Another object of our invention is to provide a transmission in which an automatic change between an intermediate and a high speed ratio may be effected responsive to variations in the speed of rotation of the driven shaft above and below predetermined or critical speeds, with means for manually effecting a shift between intermediate and high speed ratios and together with means for rendering the transmission ineffective for automatically effecting a change in the driving ratio.

Another object of our invention is to provide an automatic transmission having a clutch unit shiftable for providing positive and free wheeling drives in both intermediate and high gear, and operable for effecting automatic changes in the driving ratio between intermediate and high free wheeling drives, responsive to variations of the speed of rotation of the driven shaft above and below critical or predetermined speeds.

Another object of our invention is to provide means for optionally selecting either a positive or a free wheeling drive in any forward driving gear ratio.

For a better understanding of the invention, reference may now be had to the accompanying drawings, of which there are three sheets, forming a part of the specification, and in which:

Fig. 1 is a diagrammatic view of a portion of an automotive vehicle in which a transmission embodying our invention has been incorporated;

Fig. 2 is a longitudinal view, partly in section, illustrating the internal mechanism of the transmission;

Fig. 3 is a top plan view of the transmission illustrated in Fig. 2 disclosing the mechanism for manually effecting a change in the driving ratio;

Fig. 4 is a cross sectional view taken on the line 4—4 of Fig. 2, looking in the direction of the arrows, and illustrating the construction of the automatic clutch mechanism;

Fig. 5 is a cross sectional view taken on the line 5—5 of Fig. 2, looking in the direction of the arrows, and illustrating the construction of the overrunning clutch mechanism;

Fig. 6 is a diagram of the handle positions of the gear shift lever; and

Fig. 7 is a longitudinal view, partly in section, illustrating the internal mechanism of a transmission embodying a modified form of our invention.

Referring now particularly to Fig. 1, there is diagrammatically illustrated a portion of an automotive vehicle having a main frame 10, providing a support for an engine 12, a housing enclosed clutch mechanism 14, a transmission indicated generally at 16, a manually operable shift lever 18 for controlling the transmission, a propeller shaft 20, and a universal joint mechanism 22 connecting the driven shaft 24 of the transmission to the propeller shaft 20.

Having reference now to Fig. 2, the transmission in general comprises a casing 26 for housing the operating mechanism, a driving shaft 23 journaled in a bearing 28 suitably secured in an aperture in the forward wall of the transmission casing 26, a driven shaft 24 journaled at its forward end in a roller bearing 30 secured within a counter bore in the end of the driving shaft 23 and at its rearward end in a bearing 32 suitably secured in an aperture in the rearward wall of the transmission casing 26, a countershaft 34 secured against rotation in the forward and rearward walls of the casing 26 and providing a support for a cluster of gears 36 rotatable on the countershaft as a unit, a plurality of yoke rods 40 and 42 slidably secured in the forward and rearward walls of the transmission casing and providing means for connecting the shift lever 18 to the gears of the transmission for effecting a shift of the same, and a cover plate 38 providing a support for the shift lever 18.

A helical gear 44 may be formed on the driving shaft 23 adjacent one end thereof and within the casing 26, for meshing with a helical gear 46 of the cluster of gears for continuously rotating the same whenever the driving shaft 23 is connected to the engine through the housing enclosed clutch mechanism 14. A clutch unit 50 freely mounted on the driven shaft 24 is adapted to cooperate with a gear 56 slidably splined to the driven shaft 24 for the purpose of providing either a one-way or a two-way low speed drive between the driving and the driven shaft.

The clutch unit 50 comprises a driving member 52 having an external set of helical teeth 53 meshing with a helical gear 58 of the cluster of gears and a set of internal radial teeth 60 adapted to mesh with an external set of radial teeth 62 provided on the slidable gear 56, a driven member 54, rotatably mounted on the driven shaft 24 but secured against lateral displacement thereon by thrust washers 55 and having an external radial set of teeth 64 adapted to mesh with an internal set of teeth 66 provided on the gear 56, and a series of rollers 68, each of which is disposed in one of a series of eccentric raceways provided between the contiguous surfaces of the driving and driven members and which are adapted to be forced into the narrower end of the raceways for rotating the driven member with the driving member in one direction only. The clutch unit 50 is similar in construction and operation to the overrunning clutch illustrated in Fig. 5.

Movement of the gear 56 to the left, looking at Fig. 2, to mesh teeth 66 thereof with external teeth 64 on member 54 of the clutch unit, is adapted to provide a one-way or free wheeling low speed drive between the driving and the driven shafts and through the intermediary of helical gears 44, 46 and 58, driving member 52 of the clutch unit, rollers 68, driven member 54 of the clutch unit and gear 56 which is splined to the driven shaft. Further movement of the gear 56 to the left, to mesh teeth 62 thereof with teeth 60 on the driving member 52 of the clutch unit, is adapted to provide a two-way or positive low speed drive between the driving and the driven shaft, and through the intermediary just described, with the exception of rollers 68 and driven member 54 of the clutch unit which now are, in effect, locked out of the driving connection. Movement of the gear 56 to the right, looking at Fig. 2, will mesh the teeth 62 thereof with those of an idler gear 69 which is suitably mounted within the casing 26 and is in constant mesh with gear 70 of the cluster of gears, to provide a reverse driving connection between the driving and the driven shafts. A shift fork 72, carried by the yoke rod 40 is provided for shifting the gear 56.

An intermediate speed helical gear 74 rotatably mounted on the driven shaft 24 is in constant mesh with a helical gear 76 of the cluster of gears on the countershaft and is secured against lateral displacement by thrust washers 78. Gear 74 is provided with an internal set of radial teeth 80 and comprises the driving member of an intermediate speed clutch unit indicated generally at 82. The clutch unit comprises a driving member provided by the gear 74 in the form of a drum-shaped shell 84 and a driven member 86 provided with two sets of internal radial teeth 88 and 90. One of a series of rollers 92 is disposed in each of a series of eccentric raceways provided between the driving member 84 and the driven member 86 for the purpose of locking the driven member to the driving member when the driving member is rotating in one direction only. The operation and construction of the clutch unit is also similar to that of the overrunning clutch illustrated in Fig. 5.

An overrunning and automatic clutch unit indicated generally at 94, is carried by a sleeve 96 slidably splined to the driven shaft 24, and provided with an external radial set of teeth 99, which are adapted to mesh with teeth 88, 90, or 80, provided on the intermediate speed clutch unit 82.

The overrunning clutch mechanism of the unit 94 is similar to the overrunning clutch mechanism of the clutch units 82 and 50 and is shown in section in Fig. 5. A shell 97 comprises the driven member of the overrunning clutch and a core 98 provided with a set of internal teeth 100 which are adapted to mesh with an external set of teeth 102 provided on the end of the driving shaft 23 comprises the driving member of the overrunning clutch. One of a series of rollers 104 are disposed in each of a series of eccentric raceways provided between the driving and the driven member of the high speed overrunning clutch, to drive the shell 97 with the core 98 when the core is rotating in a clockwise direction, looking at Fig. 5.

The shell 97 also comprises the driving member of an automatic clutch which includes a driven member 108 provided on the end of the sleeve 96 and which carries a plurality of radially movable bolts 110, which are adapted under predetermined conditions of operation to lock the driven member 108 to the driving member 97. The driven member 108 of the automatic clutch mechanism is provided with an internal set of teeth 112 which, as shown, are in mesh with the teeth 102 provided on the end of the driving shaft.

The shell 97 is provided with a plurality of equidistantly spaced slots 114 in the periphery thereof, any one of which is at any one time adapted to receive one of the bolts 110. The bolts 110 are radially movably disposed in radial grooves 116 provided in the core 108, and are provided with a transverse bore 117, a longitudinally threaded bore 118, and notches 120 and 122 on opposite sides thereof. A pin 124 carried by the core face plate 125 projects into the bore 117 and is adapted to confine between a flatted portion thereof and an adjustable plug 126 threadedly secured in the bore 118, a spring 128 which is adapted to resist radial outward movement of the bolts 110 under the influence of centrifugal force resulting from rotation of the core 108.

A spring pressed poppet 130 backed by an adjustable plug 132 is adapted to engage the notch 120 in the side of the bolt 110, when the bolt is in its retracted position (as shown), and a similar spring pressed poppet 134, backed by an adjustable plug 135, is adapted to engage in the notch 122 on the side of the bolt when the bolt is in its projected or outward position.

Each of the bolts 110 is provided with an eccentric or beveled face 136 which is adapted to cause the bolts to "jump" the slots 114 when the driving member or shell 97 is rotating at a rate of speed substantially in excess of that of the member 108. Whenever the speed of rotation of the members 97 and 108 has been synchronized, or substantially so, one of the bolts 110 will be projected outwardly into one of the slots 114 for the purpose of locking the members 97 and 108 together, assuming that the speed of rotation of the core or driven member 108 is sufficient to build up enough centrifugal force to move the bolt 110 outwardly against the tension of the spring 128 and the thrust force of the poppet 130.

The bolt 110 will remain in its projected or outward position until the speed of rotation of the driven member 108 falls below that sufficient to hold the bolt 110 outwardly. Because the center of gravity of the bolt 110 is moved radially outwardly when the bolt moves to its outward position, a lower speed of rotation of the core 108 will be sufficient to hold the bolt in its outward position, than that necessary to move the bolt outwardly. The spring pressed poppet 134 engaging in the notch 122 will also tend to hold the bolt 110 in its outward position until the tension of the spring 128 is greater than the centrifugal force of the bolt 110 and the thrust force of the poppet 134 when the bolt will be moved inwardly or to the position shown, and assuming that the torque between the shell 97 and the bolt 110 is released.

A shift fork 140 carried by the yoke rod 42 is provided for moving the overrunning and automatic clutch unit 94. Yoke rods 40 and 42 are provided with gates 142 and 144, respectively, which are adapted to be engaged by the bottom end of the shift lever 18 for the purpose of placing the transmission in the various gear positions, as indicated in Fig. 6. The yoke rod 42 is provided with a series of notches 146, 148, 150, 152 and 154 on the under side thereof, and corresponding respectively to the positive high, automatic, neutral, free wheeling second, and positive second speed ratios, and which are adapted to be engaged by a spring pressed poppet 156 for the purpose of locating the relative positions of the gears and of holding the yoke rod against undesirable movement. The yoke rod 40 is provided with similar notches 158, 160, 162 and 164 corresponding respectively with the reverse, neutral, free wheeling low and positive low positions of the yoke rod 40, and which notches are adapted to be engaged by a poppet similar to that shown at 156.

As illustrated, the transmission is in positive high gear,—that is, the driven shaft 24 is positively connected directly to the driving shaft 23 through the intermediary of sleeve 96 which is splined to the driven shaft 24 and whose teeth 112 are in engagement with the teeth 102 provided on the posterior end of the driving shaft 23.

When the transmission is in positive high gear, the driven member 86 of the intermediate speed clutch unit 82 is also connected to the sleeve 96 and will rotate therewith, but will overrun the driving member 84 of the clutch unit 82.

Movement of the yoke rod 42 to a position where the notch 152 engages the poppet 156, will move teeth 112 out of engagement with the teeth 102 on the end of the driving shaft, whereupon the transmission will be in automatic position. Assuming that the speed of rotation of the driven shaft is insufficient to move the bolts 110 outwardly, the driven shaft will be connected to the driving shaft through the intermediary of helical gears 44, 46, 76 and 74, and clutch unit 82, the teeth 88 of which are in mesh with teeth 99 on the sleeve 96 which is splined to the driven shaft. After the speed of rotation of the driven shaft attains a predetermined rate, the bolts 110 will tend to fly outwardly, but will be prevented from so doing, by the overrunning of the driving member 97.

Whenever approximate synchronization of the speeds of rotation of the driving member 97 and the driven member 108 takes place, such as by a momentary closing of the engine throttle to reduce the speed of the engine, the speed of the driving member 97 will decelerate until it approximates that of the driven member, whereupon one of the bolts 110 will be projected outwardly for the purpose of connecting the driving and the driven members and for preventing a further decrease in the speed of rotation of the driving member 97. This will effect an automatic shift from intermediate to high speed, and the driven shaft 24 will be connected to the driving shaft 23 through the intermediary of driving member 98 of the overrunning clutch, rollers 104, shell 97, a bolt 110, core 108 which is carried by the sleeve 96 which in turn is splined to the driven shaft 24. A subsequent reduction of the speed of rotation of the driven shaft 24 below a predetermined or critical speed, will permit the spring 128 to overcome the centrifugal force resulting from rotation of the core 108, and the thrust force of the poppet 134 for the purpose of moving the bolt 110 to its inward position. When the bolt is moved to its inward position, the drive will again be through the intermediary of the intermediate speed overrunning clutch unit 82.

Movement of the yoke rod 42 to the right, to a position where the poppet 156 engages notch 148, will move teeth 100 on the driving member 98 of the high speed overrunning clutch, out of engagement with the teeth 102 on the driving shaft, and will move teeth 99 into engagement with teeth 90 of the intermediate speed clutch unit 82. The transmission will then be in free wheeling second, and the drive will be the same as when the transmission is in automatic second. In this position, however, because the driving connection between the teeth 102 and the high speed clutch unit 94 has been broken, no automatic shift from intermediate to high nor from high to intermediate may be effected, and the transmission will remain in intermediate free wheeling speed ratio. Further movement of the yoke rod 42 to the right until the notch 146 engages the poppet 156, will move teeth 99 on the sleeve 96 into engagement with teeth 80 on the gear 74 to provide an intermediate speed positive drive between the shaft and through the intermediary of helical gears 44, 46, 76, 74 and sleeve 96, which is splined to the driven shaft 24. When the poppet 156 is in engagement with the notch 150, the teeth 99 on the sleeve 96 will not be in engagement with any teeth of the clutch unit 82, and the transmission will then be in neutral position.

It will thus be seen that positive and free wheeling drives are provided in all forward speeds, and a change from any one drive to any other drive may be effected at any time without regard to the speed of rotation of the driven shaft by manipulation of the shift lever 18 and upon a momentary closing of the engine throttle to release the torque between the interengaging teeth. It will be noted that to go from any one positive forward drive to any other positive forward drive, it is necessary to go through two free wheeling drives. On this account, a change may be made from any one speed ratio to any other speed ratio without the necessity of disengaging the main engine clutch 14.

Fig. 7 discloses a transmission embodying a modified form of our invention wherein a single shiftable clutch unit, indicated generally at 194, is provided for effecting positive and free wheeling drives in both intermediate and high speeds and for effecting automatic changes in the driving ratio between intermediate and high speed, responsive to speed control of the driven shaft. The transmission disclosed in Fig. 7 operates in the same manner and performs exactly the same functions as the transmission illustrated in Fig. 2, but embodies a different construction in that the intermediate speed overrunning clutch is carried by the clutch unit 194 (Fig. 7), corresponding to the clutch unit 94 of Fig. 2, instead of by the intermediate speed helical gear 74.

The construction of the transmission (illustrated in Fig. 7), with the exception of the clutch unit 194 and the intermediate speed helical gear 174, is identical with that of Fig. 2, and for that reason, the same reference characters have been applied to corresponding parts of the transmissions illustrated in Figs. 2 and 7.

The intermediate speed helical gear 174 is provided with a laterally extending drum 176 upon which two spaced sets of radial external teeth 178 and 180 and an internal set of teeth 182 are provided and which may be considered as automatic, intermediate free wheeling, and intermediate positive clutch members or elements, respectively.

The clutch unit 194 comprises a plurality of relatively rotatable members: a supporting member 196 slidably splined to the driven shaft 24 and adapted selectively to effect positive drives between the intermediate speed gear 174 or the high speed gear or clutch member 102 and the driven shaft 24, respectively, and which comprises the driven member of the intermediate speed overrunning clutch and of the automatic clutch; a high speed free wheeling clutch driving member 200; a high speed free wheeling clutch driven member 197, which together with the member 200 comprises the driving member of an automatic clutch embodied in the clutch unit 194; and an intermediate speed free wheeling clutch driving member 184.

The supporting member 196 comprises a sleeve, the forward end of which is provided with an internal set of teeth 212 engageable with the clutch member 102 for effecting a positive high speed drive between the driving and driven shafts, and with an external set of teeth 199 at the rearward end thereof, engageable with the internal teeth 182 provided in the drum 176 for effecting a positive intermediate speed drive between the driving and the driven shafts.

An annulus 186 is fixedly splined to the sleeve 196 and provides a cam member for the intermediate speed overrunning clutch, which cam member is provided with a series of eccentric raceways (similar to those provided at 106 in member 98, see Fig. 5) in each of which there is disposed a spring pressed roller 192 biased toward the narrower end of the raceways.

The intermediate speed free wheeling clutch driving member 184 comprises a collar, the inner surface of which forms one side of the eccentric raceways provided about the periphery of member 186 and has affixed thereto, ring 190 which provides a groove for receiving a shift fork 140 and ring 188 which is provided with an internal set of teeth 198 which are selectively engageable with teeth 178 and 180 for placing the transmission in free wheeling intermediate and automatic drive positions. Spring pressed rollers 192 are adapted to effect a one-way drive between the intermediate speed helical gear 174 and the driven shaft through the intermediary of drum 176, either set of teeth 178 or 180 mating with teeth 198, ring 188, collar 184, rollers 192, annulus 186, and sleeve 196, the latter of which is splined to the driven shaft, but which rollers 192 are adapted to permit driven shaft 24, sleeve 196 and annulus 186 affixed thereto to overrun or rotate faster than intermediate speed gear 174 and collar 184 connected thereto. This overrunning action takes place when the drive between the shafts is through the intermediate speed gear 174 and the speed of the engine has been relatively cut such as by closing of the engine throttle, or the drive between the shafts is through clutch member 102.

The driving and driven members 197 and 200, respectively, of the high speed overrunning clutch are of a construction similar to that illustrated in Fig. 5, and are adapted to provide a one-way drive between the shafts subsequent to the automatic clutch becoming operative. This action is exactly the same as that of the high speed overrunning clutch used in the transmission illustrated in Fig. 2. The member 197 is provided with a plurality of equidistantly spaced circumferential slots 214, any one of which at any one time is adapted to receive a radially movable bolt 210 carried by the supporting member 196 and operable responsive to centrifugal force resulting from rotation of the sleeve 196 with the driven shaft 24. The bolt 210 may be part of an automatic clutch of the type illustrated in Fig. 4, and the operation of which has been described heretofore.

The automatic clutch embodied in the clutch unit 194 will be operable for effecting a change in the driving ratio between the driving and driven shafts responsive to speed control of the driven shaft whenever only teeth 216 provided on the driving member 200 are mating with gear 102 and when teeth 198 are mating with teeth 178 provided on the intermediate speed helical gear drum 176. When the clutch unit has been shifted to this position, the handle of the shift lever will be in "auto" (automatic) position, as indicated in Fig. 6.

Clutch unit may be shifted from the position shown in Fig. 7 for effecting: a positive intermediate speed drive between the shafts through the intermediary of gears 44, 46, 76, 174 and sleeve 196 when teeth 199 thereof are in engagement with teeth 182 provided on the intermediate speed gear drum 176; a free wheeling intermediate speed drive through the intermediary of gears 44, 46, 76, 174, members 188, 184, rollers 192, members 186 and 196, when teeth 198 provided on member 188 are mating with teeth 180 provided on the intermediate speed gear drum 176. These teeth will be mated when a positive intermediate speed drive is provided between the shafts, but will in effect be locked out of the drive at such time; a positive high speed drive through the intermediary of gear 102 and sleeve 196 when teeth 212 thereof are mating with teeth provided on gear 102; and an automatic drive either in high speed or in intermediate speed, depending upon the speed of the driven shaft 124.

The automatic drives will be free wheeling drives, and the high speed automatic drive will be through the intermediary of member 200, rollers 204, member 197, bolt 210 and sleeve 196. The free wheeling high speed clutch may, if desired, be omitted by making members 197 and 200 integral, in which case the automatic high speed drive would be a positive one.

The transmission may be set, by manipulation of the shift lever 18, for providing a locked-up drive in either intermediate or high speed, in which event the automatic clutch would be ineffective for effecting a change in the driving ratio between the shafts.

Both the intermediate and high speed positive drives are "locked up", and a free wheeling intermediate "locked-up" drive is also provided when teeth 216 are not mating with gear 102 and only teeth 198 of the clutch unit 194 are mating with teeth 180 of the intermediate speed gear drum 176.

While several specific embodiments of our automatic speed changing mechanism have been illustrated and described, it must be appreciated that many modifications may be made in the construction of the details thereof without departing from the scope of the invention, and for that reason we do not desire to be limited to any particular form or arrangement except in so far as such limitations are included in the following claims.

We claim:

1. In a device of the class described, the combination of a driving shaft, a pair of clutch elements operatively associated with such shaft, a shaft adapted to be driven by said clutch elements at relatively different rates, a shiftable clutch unit mounted on one of said shafts, each of said clutch elements respectively forming a part of a disconnectable clutch, the complementary parts of which are associated with such clutch unit, means for shifting said clutch unit for simultaneously coupling such clutches, said clutch unit comprising a connection between said clutch elements and said driven shaft which includes a part of each of said disconnectable clutches, and an automatic clutch operatively associated with one of said disconnectable clutches.

2. In a transmission, the combination of a driving shaft provided with a clutch element, a driven shaft having a gear rotatably mounted thereon and connected through a train of gearing to said driving shaft to be driven therefrom and at a different rate, an overrunning clutch operably associated with said gear on said driven shaft, said gear and said overrunning clutch being provided with clutch elements, a clutch unit including a part mounted on said driven shaft for rotation therewith and a plurality of clutch elements carried by said part and cooperable with said other clutch elements, said clutch unit including a centrifugally operable clutch adapted to form an operative connection between said part and one of said clutch elements carried thereby which is cooperable with said driving shaft clutch element, and means for shifting said clutch unit for selectively coupling the clutch elements thereof with said other clutch elements.

3. In a transmission, the combination of a driving shaft having a gear thereon, a driven shaft having a gear rotatably mounted thereon and connected through a train of speed reduction gearing to the driving shaft, an overrunning clutch for said gear on the driven shaft, and a clutch unit adapted to cooperate with said overrunning clutch and said gears for providing both positive and free wheeling drives between the driven shaft and each of said gears and comprising a supporting member slidably mounted on said driven shaft, an intermediate member carried by the supporting member and capable of rotation relative thereto, an overrunning clutch driving member carried by said intermediate member and connected therewith for driving the same in one direction only, and means carried by said supporting member operable responsive to variations in the speed of rotation thereof above and below predetermined rates for connecting and disconnecting said supporting and intermediate members, and means for shifting said clutch unit for optionally selecting a drive between the driving and the driven shafts.

4. In a device of the class described, the combination of two gears rotating at different rates of speed and driven by a common source of power, a shaft adapted to be connected to said gears to be driven thereby, an overrunning clutch for one of said gears, a clutch unit mounted on said driven shaft, said clutch unit being adapted to cooperate with said overrunning clutch and said gears for providing both positive and free wheeling driving connections between the driven shaft and each of said gears and being provided with means operable for automatically changing the driving connection between said gears and said shafts from one gear to the other responsive to variation in the speed of rotation of said driven shaft above and below predetermined rates of speed, and manipulative means for shifting said clutch unit for changing from any one driving connection to any other without regard to the speed of rotation of said driven shaft.

5. In a change speed gearing for providing a plurality of forward drives between an engine and the road wheels of an automotive vehicle, the combination of a high speed clutch member and a low speed clutch member driven by said engine, a driven shaft, an overrunning clutch associated with said low speed clutch member, a clutch unit comprising a supporting member connected to the driven shaft adapted selectively to connect the low and high speed clutch members to the shaft to provide two-way drives between each of said clutch members and said shaft respectively and to connect said low speed clutch member to said shaft through the overrunning clutch to provide a one-way drive between said low speed clutch member and said shaft, an overrunning clutch supported by said supporting member and adapted to provide a one-way drive between said high speed clutch member and said shaft, and means for shifting said clutch unit without regard to the speed of rotation of said shaft to effect an optional change between any of said drives.

6. In a device of the class described, the combination of two gears rotating at different rates of speed and driven from a common source of power, a shaft adapted to be connected to said gears to be driven thereby, an overrunning clutch for the slower rotating of said gears, and a shiftable clutch unit for providing a plurality of driving connections between said shaft and said gears and operable for effecting an automatic change in the driving connection from one of said gears to the other of said gears, said clutch unit comprising a free wheeling clutch driving member having teeth for connecting the same to the faster rotating of said gears, an intermediate member adapted to support said driving member, a supporting member for said intermediate member slidably mounted on said shaft, and having means for engaging the slower rotating of said gears for providing a two-way drive between said last mentioned gear and said shaft, and other means for engaging the faster rotating of said gears for providing a two-way driving connection with said shaft, and centrifugal means carried by said supporting member and operable responsive to a predetermined speed of rotation of said shaft for connecting said supporting and intermediate members to provide a one-way drive between the faster rotating of said gears and said shaft, and manipulative means for shifting said clutch unit to change the driving connection between said gears and said shaft without regard to the speed of rotation thereof.

7. In a device of the class described, the combination of aligned driving and driven shafts, clutch elements carried by each of said shafts and rotating at different rates of speed and adapted to be connected to said driven shaft for driving the same, a clutch member slidably splined to said driven shaft and adapted to connect each of said clutch elements to said driven shaft for driving the same, means carried by said clutch member operable responsive to centrifugal force resulting from rotation thereof for operatively connecting the driven shaft to the driving shaft clutch element, said clutch member normally being in a position where said means are ineffective, and shifting means for moving said clutch member into and out of the position where said means may be effective and without regard to the speed of rotation of said clutch member.

8. A variable speed power transmitting mechanism comprising driving and driven shafts, a plurality of driving clutch elements driven from said driving shaft and at different rates, a clutch unit slidably splined to said driven shaft and operable for selectively connecting the same to said clutch elements to be driven thereby, said clutch unit including driven clutch elements operatively engageable with said driving clutch elements, a supporting member for said driven clutch elements, an overrunning clutch operatively associated with one of said clutch elements to provide a one-way driving connection between one of said driving clutch elements and said driven shaft, and centrifugally operable means carried by said supporting member and operably associated with another of said clutch elements, said centrifugally operable means being adapted to render said last mentioned driving clutch element operative and inoperative for driving said driven shaft.

9. A variable speed power transmitting mechanism comprising driving and driven shafts, a pair of driving clutch elements driven from said driving shaft and at different rates, an automatic clutch unit operable for alternatively rendering said clutch elements operative for driving said driven shaft, said unit including a supporting member mounted for rotation with said driven shaft, clutching means including an overrunning clutch carried by said member and operatively engageable with one of said driving clutch elements to provide an initial one-way driving connection between said shafts, clutching mechanism carried by said member and engageable with the other of said driving clutch elements at such time as said initial driving connection is provided between said shafts, and centrifugal force responsive means operatively associated with said clutching mechanism and operable responsive to variations in the speed of rotation of said driven shaft for rendering said clutching mechanism operative and inoperative to provide a driving connection between said last mentioned driving clutch element and said driven shaft.

10. A variable speed power transmitting mechanism comprising driving and driven shafts, a pair of driving clutch elements driven from said driving shaft and at different rates, an automatic clutch unit operable for alternatively rendering said clutch elements operative for driving said driven shaft, said unit including a supporting member mounted for rotation with said driven shaft, clutching means including an overrunning clutch carried by said member and operatively engageable with one of said driving clutch elements to provide an initial one-way driving connection between said shafts, clutching mechanism carried by said member and engageable with the other of said driving clutch elements at such time as said initial driving connection is provided between said shafts, centrifugal force responsive means operatively associated with said clutching mechanism and operable responsive to variations in the speed of rotation of said driven shaft for rendering said clutching mechanism operative and inoperative to provide a driving connection between said last mentioned driving clutch element and said driven shaft, a plurality of positive clutching elements carried by said member and selectively operatively engageable with said driving clutch elements, and manipulative means for shifting said clutch unit for selectively coupling said positive clutching elements with said driving clutch elements whereby said overrunning clutch and said centrifugal means will be rendered ineffective.

11. In a transmission having driving and driven shafts with a pair of driving elements driven from said driving shaft at different rates, a clutch unit having a supporting part slidably splined on said driven shaft and including a clutch element mounted on said supporting part and selectively engageable with the slower rotating of said driving elements to provide an initial one-way driving connection between said shafts, a centrifugally actuated clutch mechanism mounted on said supporting part and including an overrunning clutch, the driving part of which is optionally engageable with the faster rotating of said driving elements at such time as said initial driving connection is provided between said shafts, a shell providing a driven part for said overrunning clutch, a centrifugal locking member rotatable with said supporting part and at a rate different than that of said shell during such time as said initial driving connection is provided between said shafts, said locking member being operatively engageable with said shell to provide a driving connection between said shafts through said centrifugally actuated clutch mechanism and around said initial driving connection, and means associated with the slower rotating of said driving elements and the clutch element engageable therewith for maintaining said initial one-way driving connection between said shafts when the driving part of said overrunning clutch is shifted out of engagement with the faster rotating of said driving elements.

12. In a transmission having driving and driven shafts, with a pair of driving elements driven from said driving shaft at different rates, a clutch unit having a supporting member slidably splined on said driven shaft and including a clutch element selectively engageable with the slower rotating of said clutch elements to provide an initial one-way driving connection between said shafts, a centrifugally actuated clutch mechanism mounted on said supporting member and including a driving part adapted to be driven by the faster rotating of said driving elements at such time as said initial driving connection is provided between said shafts, a centrifugal locking member rotatable with said supporting member and at a rate different than that of said driving part at such time as said initial driving connection is provided between said shafts, said locking member being operatively engageable with said driving part to provide a driving connection between said shafts through said centrifugally actuated clutch mechanism and around said initial driving connection, and means associated with the slower rotating of said driving elements and the clutch element associated therewith for maintaining said initial one-way driving connection between said shafts when the driving part of said centrifugally actuated clutch mechanism is shifted out of engagement with the faster rotating of said driving elements, and manipulative means for shifting said clutch unit.

13. In a transmission, the combination of a driving shaft, with a driven shaft, a pair of driving elements driven at different rates from said driving shaft, a clutch unit connected to said driven shaft and embodying a plurality of clutch members selectively cooperable with said driving elements, means for selectively coupling any one of said clutch members with its associated driving element to provide a drive between said shafts, two of said clutch members being adapted to be coupled with their respective driving elements at the same time, a centrifugally actuated mechanism for controlling the operativeness of one of said clutch members, an overrunning clutch mechanism associated with the other of said clutch members and operable at such time as said centrifugally actuated mechanism is inoperative, said centrifugally actuated mechanism being operable responsive to variations in speed of said driven shaft for rendering the clutch member associated therewith operable and inoperable.

14. A variable speed power transmitting mechanism having in combination two gears adapted to rotate at different speeds and driven from a common source, a shaft adapted to be selectively connected to said gears to be driven thereby, a clutch unit slidably mounted on said shaft and provided with a plurality of clutch members selectively cooperable with each of said gears for providing one-way and two-way drives between the same and said shaft, respectively, said clutch unit being shiftable to engage a clutch member thereon with the slower rotating of said gears to effect a one-way drive between said gear and said shaft, and further shiftable to engage a second clutch member with the faster rotating of said gears whereby said shaft will overrun the slower rotating of said gears, but said gear will be operable to continue the drive whenever the second clutch member is moved out of engagement with the faster rotating of said gears.

CARL F. RAUEN.
JOHN T. RAUEN.